US008352613B2

(12) United States Patent
Sivasubramanian et al.

(10) Patent No.: US 8,352,613 B2
(45) Date of Patent: *Jan. 8, 2013

(54) CONTENT MANAGEMENT

(75) Inventors: Swaminathan Sivasubramanian, Seattle, WA (US); David R. Richardson, Seattle, WA (US); Bradley E. Marshall, Bainbridge Island, WA (US); Christopher L. Scofield, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/956,566

(22) Filed: Nov. 30, 2010

(65) Prior Publication Data

US 2011/0072140 A1 Mar. 24, 2011

Related U.S. Application Data

(62) Division of application No. 12/189,019, filed on Aug. 8, 2008, which is a division of application No. 12/060,213, filed on Mar. 31, 2008.

(51) Int. Cl.
*G06F 15/173* (2006.01)
(52) U.S. Cl. ........................................ 709/226; 709/200
(58) Field of Classification Search .................. 709/226
See application file for complete search history.

(56) References Cited

U.S. PATENT DOCUMENTS

| 5,341,477 A | 8/1994 | Pitkin et al. |
| 5,611,049 A | 3/1997 | Pitts |
| 5,774,660 A | 6/1998 | Brendel et al. |
| 5,892,914 A | 4/1999 | Pitts |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |

(Continued)

FOREIGN PATENT DOCUMENTS

CN 1422468 A 6/2003

(Continued)

OTHER PUBLICATIONS

Baglioni et al., "Preprocessing and Mining Web Log Data for Web Personalization", LNAI 2829, 2003, pp. 237-249.

(Continued)

*Primary Examiner* — John Follansbee
*Assistant Examiner* — Anthony Mejia
(74) *Attorney, Agent, or Firm* — Knobbe, Martens, Olson & Bear, LLP

(57) ABSTRACT

A system and method for management and processing of resource requests is provided. A content delivery network service provider determines a class associated with a set of client computing devices and monitors resources requests for the determined class. The content delivery network service provider then identifies at least one cache component for providing additional content, such as advertisement content or other additional content provided in anticipation of future resource requests, to client computing devices as a function of the determined class. In other embodiments, instead of cache components, the content delivery network service provider identifies a second set of client computing devices as a function of the determined class for providing the additional content information.

16 Claims, 9 Drawing Sheets

U.S. PATENT DOCUMENTS

| | | | |
|---|---|---|---|
| 6,205,475 B1 | 3/2001 | Pitts | |
| 6,275,496 B1* | 8/2001 | Burns et al. | 370/429 |
| 6,286,043 B1* | 9/2001 | Cuomo et al. | 709/223 |
| 6,286,084 B1 | 9/2001 | Wexler et al. | |
| 6,304,913 B1 | 10/2001 | Rune | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,374,290 B1* | 4/2002 | Scharber et al. | 709/205 |
| 6,415,280 B1 | 7/2002 | Farber et al. | |
| 6,457,047 B1 | 9/2002 | Chandra et al. | |
| 6,484,143 B1 | 11/2002 | Swildens et al. | |
| 6,505,241 B2 | 1/2003 | Pitts | |
| 6,553,413 B1 | 4/2003 | Leighton et al. | |
| 6,560,610 B1 | 5/2003 | Eatherton et al. | |
| 6,654,807 B2 | 11/2003 | Farber et al. | |
| 6,658,462 B1 | 12/2003 | Dutta | |
| 6,678,791 B1 | 1/2004 | Jacobs et al. | |
| 6,694,358 B1 | 2/2004 | Swildens et al. | |
| 6,732,237 B1 | 5/2004 | Jacobs et al. | |
| 6,754,699 B2 | 6/2004 | Swildens et al. | |
| 6,754,706 B1 | 6/2004 | Swildens et al. | |
| 6,769,031 B1 | 7/2004 | Bero | |
| 6,785,704 B1 | 8/2004 | McCanne | |
| 6,804,706 B2 | 10/2004 | Pitts | |
| 6,829,654 B1 | 12/2004 | Jungck | |
| 6,874,017 B1* | 3/2005 | Inoue et al. | 709/217 |
| 6,963,850 B1 | 11/2005 | Bezos et al. | |
| 6,981,017 B1 | 12/2005 | Kasriel et al. | |
| 6,986,018 B2* | 1/2006 | O'Rourke et al. | 711/213 |
| 6,990,526 B1 | 1/2006 | Zhu | |
| 6,996,616 B1 | 2/2006 | Leighton et al. | |
| 7,003,555 B1 | 2/2006 | Jungck | |
| 7,006,099 B2* | 2/2006 | Gut et al. | 345/557 |
| 7,007,089 B2 | 2/2006 | Freedman | |
| 7,010,578 B1 | 3/2006 | Lewin et al. | |
| 7,010,598 B2 | 3/2006 | Sitaraman et al. | |
| 7,032,010 B1 | 4/2006 | Swildens et al. | |
| 7,058,706 B1 | 6/2006 | Iyer et al. | |
| 7,058,953 B2* | 6/2006 | Willard et al. | 718/105 |
| 7,065,587 B2 | 6/2006 | Huitema et al. | |
| 7,072,982 B2 | 7/2006 | Teodosiu et al. | |
| 7,082,476 B1 | 7/2006 | Cohen et al. | |
| 7,086,061 B1 | 8/2006 | Joshi et al. | |
| 7,092,505 B2 | 8/2006 | Allison et al. | |
| 7,092,997 B1 | 8/2006 | Kasriel et al. | |
| 7,099,936 B2 | 8/2006 | Chase et al. | |
| 7,103,645 B2 | 9/2006 | Leighton et al. | |
| 7,117,262 B2* | 10/2006 | Bai et al. | 709/224 |
| 7,133,905 B2 | 11/2006 | Dilley et al. | |
| 7,143,169 B1* | 11/2006 | Champagne et al. | 709/226 |
| 7,146,560 B2 | 12/2006 | Dang et al. | |
| 7,149,809 B2 | 12/2006 | Barde et al. | |
| 7,152,118 B2 | 12/2006 | Anderson, IV et al. | |
| 7,174,382 B2* | 2/2007 | Ramanathan et al. | 709/227 |
| 7,185,063 B1 | 2/2007 | Kasriel et al. | |
| 7,188,214 B1 | 3/2007 | Kasriel et al. | |
| 7,194,522 B1 | 3/2007 | Swildens et al. | |
| 7,200,667 B2 | 4/2007 | Teodosiu et al. | |
| 7,225,254 B1 | 5/2007 | Swildens et al. | |
| 7,228,350 B2 | 6/2007 | Hong et al. | |
| 7,233,978 B2 | 6/2007 | Overton et al. | |
| 7,240,100 B1 | 7/2007 | Wein et al. | |
| 7,254,636 B1 | 8/2007 | O'Toole, Jr. et al. | |
| 7,260,598 B1 | 8/2007 | Liskov et al. | |
| 7,269,784 B1 | 9/2007 | Kasriel et al. | |
| 7,289,519 B1 | 10/2007 | Liskov | |
| 7,310,686 B2 | 12/2007 | Uysal | |
| 7,316,648 B2 | 1/2008 | Kelly et al. | |
| 7,320,131 B1 | 1/2008 | O'Toole, Jr. | |
| 7,321,918 B2 | 1/2008 | Burd et al. | |
| 7,363,291 B1 | 4/2008 | Page | |
| 7,441,045 B2 | 10/2008 | Skene et al. | |
| 7,461,170 B1 | 12/2008 | Taylor et al. | |
| 7,464,142 B2* | 12/2008 | Flurry et al. | 709/217 |
| 7,492,720 B2* | 2/2009 | Pruthi et al. | 370/252 |
| 7,499,998 B2 | 3/2009 | Toebes et al. | |
| 7,502,836 B1 | 3/2009 | Menditto et al. | |
| 7,519,720 B2* | 4/2009 | Fishman et al. | 709/230 |
| 7,548,947 B2 | 6/2009 | Kasriel et al. | |
| 7,552,235 B2 | 6/2009 | Chase et al. | |
| 7,573,916 B1 | 8/2009 | Bechtolsheim et al. | |
| 7,624,169 B2 | 11/2009 | Lisiecki et al. | |
| 7,650,376 B1 | 1/2010 | Blumenau | |
| 7,653,700 B1 | 1/2010 | Bahl et al. | |
| 7,657,622 B1 | 2/2010 | Douglis et al. | |
| 7,680,897 B1* | 3/2010 | Carter et al. | 709/217 |
| 7,702,724 B1 | 4/2010 | Brydon et al. | |
| 7,706,740 B2* | 4/2010 | Collins et al. | 455/3.01 |
| 7,707,314 B2 | 4/2010 | McCarthy et al. | |
| 7,725,602 B2 | 5/2010 | Liu et al. | |
| 7,739,400 B2 | 6/2010 | Lindbo et al. | |
| 7,747,720 B2 | 6/2010 | Toebes et al. | |
| 7,756,913 B1 | 7/2010 | Day | |
| 7,761,572 B1 | 7/2010 | Auerbach | |
| 7,769,823 B2* | 8/2010 | Jenny et al. | 709/219 |
| 7,773,596 B1 | 8/2010 | Marques | |
| 7,774,342 B1 | 8/2010 | Virdy | |
| 7,792,989 B2 | 9/2010 | Toebes et al. | |
| 7,809,597 B2* | 10/2010 | Das et al. | 705/7.27 |
| 7,813,308 B2 | 10/2010 | Reddy et al. | |
| 7,818,454 B2 | 10/2010 | Kim et al. | |
| 7,836,177 B2 | 11/2010 | Kasriel et al. | |
| 7,904,875 B2 | 3/2011 | Hegyi | |
| 7,912,921 B2* | 3/2011 | O'Rourke et al. | 709/219 |
| 7,925,782 B2 | 4/2011 | Sivasubramanian et al. | |
| 7,930,393 B1 | 4/2011 | Baumback et al. | |
| 7,930,427 B2 | 4/2011 | Josefsberg et al. | |
| 7,962,597 B2 | 6/2011 | Richardson et al. | |
| 7,966,404 B2* | 6/2011 | Hedin et al. | 709/227 |
| 7,991,910 B2 | 8/2011 | Richardson et al. | |
| 7,996,535 B2* | 8/2011 | Auerbach | 709/226 |
| 8,000,724 B1* | 8/2011 | Rayburn et al. | 455/456.3 |
| 8,028,090 B2 | 9/2011 | Richardson et al. | |
| 8,065,275 B2* | 11/2011 | Eriksen et al. | 707/661 |
| 8,073,940 B1 | 12/2011 | Richardson et al. | |
| 8,082,348 B1* | 12/2011 | Averbuj et al. | 709/227 |
| 8,117,306 B1 | 2/2012 | Baumback et al. | |
| 8,122,098 B1 | 2/2012 | Richardson et al. | |
| 2001/0032133 A1 | 10/2001 | Moran | |
| 2001/0034704 A1 | 10/2001 | Farhat et al. | |
| 2001/0049741 A1 | 12/2001 | Skene et al. | |
| 2001/0056416 A1 | 12/2001 | Garcia-Luna-Aceves | |
| 2001/0056500 A1 | 12/2001 | Farber et al. | |
| 2002/0007413 A1 | 1/2002 | Garcia-Luna-Aceves et al. | |
| 2002/0048269 A1* | 4/2002 | Hong et al. | 370/389 |
| 2002/0049608 A1 | 4/2002 | Hartsell et al. | |
| 2002/0052942 A1 | 5/2002 | Swildens et al. | |
| 2002/0062372 A1 | 5/2002 | Hong et al. | |
| 2002/0068554 A1 | 6/2002 | Dusse | |
| 2002/0069420 A1 | 6/2002 | Russell et al. | |
| 2002/0078233 A1 | 6/2002 | Biliris et al. | |
| 2002/0083118 A1 | 6/2002 | Sim | |
| 2002/0083148 A1 | 6/2002 | Shaw et al. | |
| 2002/0087374 A1 | 7/2002 | Boubez et al. | |
| 2002/0092026 A1 | 7/2002 | Janniello et al. | |
| 2002/0099616 A1 | 7/2002 | Sweldens | |
| 2002/0099850 A1 | 7/2002 | Farber et al. | |
| 2002/0101836 A1 | 8/2002 | Dorenbosch | |
| 2002/0116481 A1 | 8/2002 | Lee | |
| 2002/0124098 A1 | 9/2002 | Shaw | |
| 2002/0129123 A1 | 9/2002 | Johnson et al. | |
| 2002/0138286 A1 | 9/2002 | Engstrom | |
| 2002/0138437 A1 | 9/2002 | Lewin et al. | |
| 2002/0147770 A1* | 10/2002 | Tang | 709/203 |
| 2002/0156911 A1 | 10/2002 | Croman et al. | |
| 2002/0163882 A1 | 11/2002 | Bornstein et al. | |
| 2002/0188722 A1 | 12/2002 | Banerjee et al. | |
| 2003/0002484 A1 | 1/2003 | Freedman | |
| 2003/0009591 A1 | 1/2003 | Hayball et al. | |
| 2003/0037139 A1 | 2/2003 | Shteyn | |
| 2003/0065739 A1 | 4/2003 | Shnier | |
| 2003/0074401 A1 | 4/2003 | Connell et al. | |
| 2003/0101278 A1 | 5/2003 | Garcia-Luna-Aceves et al. | |
| 2003/0133554 A1 | 7/2003 | Nykanen et al. | |
| 2003/0135509 A1 | 7/2003 | Davis et al. | |

| | | | | | | |
|---|---|---|---|---|---|---|
| 2003/0140087 A1 | 7/2003 | Lincoln et al. | 2006/0155823 A1* | 7/2006 | Tran et al. | 709/216 |
| 2003/0145066 A1 | 7/2003 | Okada et al. | 2006/0161541 A1* | 7/2006 | Cencini | 707/5 |
| 2003/0149581 A1* | 8/2003 | Chaudhri et al. ............ 705/1 | 2006/0168088 A1 | 7/2006 | Leighton et al. | |
| 2003/0163722 A1 | 8/2003 | Anderson, IV | 2006/0190605 A1 | 8/2006 | Franz et al. | |
| 2003/0172183 A1 | 9/2003 | Anderson, IV et al. | 2006/0193247 A1 | 8/2006 | Naseh et al. | |
| 2003/0174648 A1 | 9/2003 | Wang et al. | 2006/0195866 A1* | 8/2006 | Thukral | 725/34 |
| 2003/0182413 A1 | 9/2003 | Allen et al. | 2006/0230137 A1* | 10/2006 | Gare et al. | 709/224 |
| 2003/0187935 A1 | 10/2003 | Agarwalla et al. | 2006/0233155 A1 | 10/2006 | Srivastava | |
| 2003/0187970 A1 | 10/2003 | Chase et al. | 2006/0253546 A1* | 11/2006 | Chang et al. | 709/217 |
| 2003/0191822 A1 | 10/2003 | Leighton et al. | 2006/0253609 A1 | 11/2006 | Andreev et al. | |
| 2003/0204602 A1 | 10/2003 | Hudson et al. | 2006/0259984 A1 | 11/2006 | Juneau | |
| 2003/0229682 A1 | 12/2003 | Day | 2006/0265508 A1 | 11/2006 | Angel et al. | |
| 2003/0233423 A1 | 12/2003 | Dilley et al. | 2006/0265516 A1 | 11/2006 | Schilling | |
| 2003/0236700 A1 | 12/2003 | Arning et al. | 2006/0265720 A1 | 11/2006 | Cai et al. | |
| 2004/0010621 A1 | 1/2004 | Afergan et al. | 2006/0271641 A1 | 11/2006 | Stavrakos et al. | |
| 2004/0019518 A1* | 1/2004 | Abraham et al. ............ 705/10 | 2006/0282522 A1 | 12/2006 | Lewin et al. | |
| 2004/0024841 A1 | 2/2004 | Becker et al. | 2007/0005689 A1 | 1/2007 | Leighton et al. | |
| 2004/0030620 A1 | 2/2004 | Benjamin et al. | 2007/0005892 A1 | 1/2007 | Mullender et al. | |
| 2004/0034744 A1* | 2/2004 | Karlsson et al. ............ 711/133 | 2007/0011267 A1 | 1/2007 | Overton et al. | |
| 2004/0039798 A1 | 2/2004 | Hotz et al. | 2007/0014241 A1 | 1/2007 | Banerjee et al. | |
| 2004/0044791 A1 | 3/2004 | Pouzzner | 2007/0038994 A1 | 2/2007 | Davis et al. | |
| 2004/0064501 A1 | 4/2004 | Jan et al. | 2007/0041393 A1 | 2/2007 | Westhead et al. | |
| 2004/0073596 A1 | 4/2004 | Kloninger et al. | 2007/0043859 A1* | 2/2007 | Ruul | 709/224 |
| 2004/0073867 A1* | 4/2004 | Kausik et al. ............ 715/500 | 2007/0050522 A1 | 3/2007 | Grove et al. | |
| 2004/0078468 A1* | 4/2004 | Hedin et al. ............ 709/227 | 2007/0055764 A1 | 3/2007 | Dilley et al. | |
| 2004/0078487 A1 | 4/2004 | Cernohous et al. | 2007/0076872 A1 | 4/2007 | Juneau | |
| 2004/0083307 A1 | 4/2004 | Uysal | 2007/0094361 A1 | 4/2007 | Hoynowski et al. | |
| 2004/0117455 A1* | 6/2004 | Kaminsky et al. ............ 709/214 | 2007/0101377 A1 | 5/2007 | Six et al. | |
| 2004/0128344 A1 | 7/2004 | Trossen | 2007/0118667 A1 | 5/2007 | McCarthy et al. | |
| 2004/0167981 A1 | 8/2004 | Douglas et al. | 2007/0118668 A1 | 5/2007 | McCarthy et al. | |
| 2004/0172466 A1 | 9/2004 | Douglas et al. | 2007/0134641 A1* | 6/2007 | Lieu | 434/350 |
| 2004/0194085 A1 | 9/2004 | Beaubien et al. | 2007/0168517 A1 | 7/2007 | Weller | |
| 2004/0203630 A1* | 10/2004 | Wang ............ 455/414.1 | 2007/0174426 A1 | 7/2007 | Swildens et al. | |
| 2004/0205149 A1* | 10/2004 | Dillon et al. ............ 709/217 | 2007/0174442 A1 | 7/2007 | Sherman et al. | |
| 2004/0205162 A1 | 10/2004 | Parikh | 2007/0183342 A1 | 8/2007 | Wong et al. | |
| 2004/0215823 A1 | 10/2004 | Kleinfelter et al. | 2007/0208737 A1 | 9/2007 | Li et al. | |
| 2004/0249971 A1 | 12/2004 | Klinker | 2007/0219795 A1 | 9/2007 | Park et al. | |
| 2004/0249975 A1 | 12/2004 | Tuck et al. | 2007/0220010 A1 | 9/2007 | Ertugrul | |
| 2004/0267906 A1 | 12/2004 | Truty | 2007/0244964 A1 | 10/2007 | Challenger et al. | |
| 2004/0267907 A1 | 12/2004 | Gustafsson | 2007/0250467 A1 | 10/2007 | Mesnik et al. | |
| 2005/0010653 A1 | 1/2005 | McCanne | 2007/0250560 A1 | 10/2007 | Wein et al. | |
| 2005/0021706 A1 | 1/2005 | Maggi et al. | 2007/0266113 A1* | 11/2007 | Koopmans et al. ............ 709/217 |
| 2005/0038967 A1 | 2/2005 | Umbehocker et al. | 2007/0266311 A1* | 11/2007 | Westphal | 715/526 |
| 2005/0044270 A1 | 2/2005 | Grove et al. | 2007/0266333 A1* | 11/2007 | Cossey et al. | 715/769 |
| 2005/0108169 A1 | 5/2005 | Balasubramanian et al. | 2007/0271385 A1 | 11/2007 | Davis et al. | |
| 2005/0108529 A1 | 5/2005 | Juneau | 2007/0280229 A1 | 12/2007 | Kenney | |
| 2005/0114296 A1 | 5/2005 | Farber et al. | 2007/0288588 A1 | 12/2007 | Wein et al. | |
| 2005/0132083 A1 | 6/2005 | Raciborski et al. | 2008/0005057 A1* | 1/2008 | Ozzie et al. | 707/1 |
| 2005/0157712 A1 | 7/2005 | Rangarajan et al. | 2008/0008089 A1 | 1/2008 | Bornstein et al. | |
| 2005/0171959 A1 | 8/2005 | Deforche et al. | 2008/0025304 A1 | 1/2008 | Venkataswami et al. | |
| 2005/0188073 A1 | 8/2005 | Nakamichi et al. | 2008/0046596 A1 | 2/2008 | Afergan et al. | |
| 2005/0192008 A1 | 9/2005 | Desai et al. | 2008/0065724 A1 | 3/2008 | Seed et al. | |
| 2005/0216569 A1 | 9/2005 | Coppola et al. | 2008/0065745 A1 | 3/2008 | Leighton et al. | |
| 2005/0216674 A1 | 9/2005 | Robbin et al. | 2008/0071859 A1 | 3/2008 | Seed et al. | |
| 2005/0232165 A1 | 10/2005 | Brawn et al. | 2008/0071987 A1 | 3/2008 | Karn et al. | |
| 2005/0259672 A1 | 11/2005 | Eduri | 2008/0072264 A1 | 3/2008 | Crayford | |
| 2005/0262248 A1 | 11/2005 | Jennings, III et al. | 2008/0082551 A1 | 4/2008 | Farber et al. | |
| 2005/0267991 A1 | 12/2005 | Huitema et al. | 2008/0086574 A1 | 4/2008 | Raciborski et al. | |
| 2005/0267992 A1 | 12/2005 | Huitema et al. | 2008/0103805 A1 | 5/2008 | Shear et al. | |
| 2005/0267993 A1 | 12/2005 | Huitema et al. | 2008/0104268 A1 | 5/2008 | Farber et al. | |
| 2005/0278259 A1 | 12/2005 | Gunaseelan et al. | 2008/0114829 A1* | 5/2008 | Button et al. ............ 709/203 |
| 2006/0013158 A1 | 1/2006 | Ahuja et al. | 2008/0134043 A1* | 6/2008 | Georgis et al. ............ 715/733 |
| 2006/0020596 A1 | 1/2006 | Liu et al. | 2008/0147866 A1 | 6/2008 | Stolorz et al. | |
| 2006/0020684 A1 | 1/2006 | Mukherjee et al. | 2008/0147873 A1* | 6/2008 | Matsumoto | 709/231 |
| 2006/0020715 A1 | 1/2006 | Jungck | 2008/0155061 A1 | 6/2008 | Afergan et al. | |
| 2006/0026067 A1* | 2/2006 | Nicholas et al. ............ 705/14 | 2008/0155614 A1 | 6/2008 | Cooper et al. | |
| 2006/0026154 A1 | 2/2006 | Altinel et al. | 2008/0162667 A1 | 7/2008 | Verma et al. | |
| 2006/0036720 A1 | 2/2006 | Faulk, Jr. | 2008/0189437 A1 | 8/2008 | Halley | |
| 2006/0037037 A1 | 2/2006 | Miranz | 2008/0201332 A1 | 8/2008 | Souders et al. | |
| 2006/0047787 A1 | 3/2006 | Agarwal et al. | 2008/0215718 A1 | 9/2008 | Stolorz et al. | |
| 2006/0063534 A1 | 3/2006 | Kokkonen et al. | 2008/0215735 A1 | 9/2008 | Farber et al. | |
| 2006/0064500 A1* | 3/2006 | Roth et al. ............ 709/231 | 2008/0215750 A1 | 9/2008 | Farber et al. | |
| 2006/0074750 A1 | 4/2006 | Clark et al. | 2008/0222281 A1 | 9/2008 | Dilley et al. | |
| 2006/0075084 A1 | 4/2006 | Lyon | 2008/0222291 A1 | 9/2008 | Weller et al. | |
| 2006/0075139 A1 | 4/2006 | Jungck | 2008/0222295 A1* | 9/2008 | Robinson et al. ............ 709/227 |
| 2006/0083165 A1 | 4/2006 | McLane et al. | 2008/0228920 A1* | 9/2008 | Souders et al. ............ 709/226 |
| 2006/0112176 A1 | 5/2006 | Liu et al. | 2008/0235400 A1* | 9/2008 | Slocombe et al. ............ 709/245 |
| 2006/0120385 A1 | 6/2006 | Atchison et al. | 2008/0275772 A1 | 11/2008 | Suryanarayana et al. | |
| 2006/0143293 A1 | 6/2006 | Freedman | 2008/0281950 A1* | 11/2008 | Wald et al. ............ 709/223 |

| | | | |
|---|---|---|---|
| 2008/0288722 A1 | 11/2008 | Lecoq et al. | |
| 2008/0301670 A1 | 12/2008 | Gouge et al. | |
| 2008/0319862 A1 | 12/2008 | Golan et al. | |
| 2009/0013063 A1 | 1/2009 | Soman | |
| 2009/0016236 A1 | 1/2009 | Alcala et al. | |
| 2009/0029644 A1 | 1/2009 | Sue et al. | |
| 2009/0031367 A1 | 1/2009 | Sue | |
| 2009/0031368 A1 | 1/2009 | Ling | |
| 2009/0031376 A1 | 1/2009 | Riley et al. | |
| 2009/0049098 A1 | 2/2009 | Pickelsimer et al. | |
| 2009/0070533 A1 | 3/2009 | Elazary et al. | |
| 2009/0086741 A1 | 4/2009 | Zhang | |
| 2009/0103707 A1 | 4/2009 | McGary et al. | |
| 2009/0106381 A1 | 4/2009 | Kasriel et al. | |
| 2009/0112703 A1* | 4/2009 | Brown | 705/10 |
| 2009/0125934 A1 | 5/2009 | Jones et al. | |
| 2009/0132368 A1 | 5/2009 | Cotter et al. | |
| 2009/0132648 A1 | 5/2009 | Swildens et al. | |
| 2009/0144412 A1* | 6/2009 | Ferguson et al. | 709/224 |
| 2009/0150926 A1 | 6/2009 | Schlack | |
| 2009/0157850 A1 | 6/2009 | Gagliardi et al. | |
| 2009/0158163 A1* | 6/2009 | Stephens et al. | 715/738 |
| 2009/0164331 A1 | 6/2009 | Bishop et al. | |
| 2009/0177667 A1* | 7/2009 | Ramos et al. | 707/100 |
| 2009/0182815 A1* | 7/2009 | Czechowski et al. | 709/206 |
| 2009/0182945 A1 | 7/2009 | Aviles et al. | |
| 2009/0187575 A1 | 7/2009 | DaCosta | |
| 2009/0204682 A1 | 8/2009 | Jeyaseelan et al. | |
| 2009/0210549 A1 | 8/2009 | Hudson et al. | |
| 2009/0248786 A1 | 10/2009 | Richardson et al. | |
| 2009/0248787 A1 | 10/2009 | Sivasubramanian et al. | |
| 2009/0248852 A1* | 10/2009 | Fuhrmann et al. | 709/224 |
| 2009/0248858 A1 | 10/2009 | Sivasubramanian et al. | |
| 2009/0248893 A1 | 10/2009 | Richardson et al. | |
| 2009/0259971 A1* | 10/2009 | Rankine et al. | 715/810 |
| 2009/0271577 A1* | 10/2009 | Campana et al. | 711/137 |
| 2009/0271730 A1* | 10/2009 | Rose et al. | 715/772 |
| 2009/0279444 A1 | 11/2009 | Ravindran et al. | |
| 2009/0287750 A1* | 11/2009 | Banavar et al. | 707/204 |
| 2009/0307307 A1 | 12/2009 | Igarashi | |
| 2009/0327517 A1 | 12/2009 | Sivasubramanian et al. | |
| 2010/0005175 A1 | 1/2010 | Swildens et al. | |
| 2010/0011061 A1 | 1/2010 | Hudson et al. | |
| 2010/0023601 A1 | 1/2010 | Lewin et al. | |
| 2010/0030662 A1 | 2/2010 | Klein | |
| 2010/0036944 A1 | 2/2010 | Douglis et al. | |
| 2010/0088367 A1 | 4/2010 | Brown et al. | |
| 2010/0100629 A1 | 4/2010 | Raciborski et al. | |
| 2010/0111059 A1* | 5/2010 | Bappu et al. | 370/338 |
| 2010/0122069 A1* | 5/2010 | Gonion | 712/216 |
| 2010/0125673 A1 | 5/2010 | Richardson et al. | |
| 2010/0125675 A1 | 5/2010 | Richardson et al. | |
| 2010/0150155 A1 | 6/2010 | Napierala | |
| 2010/0192225 A1 | 7/2010 | Ma et al. | |
| 2010/0217801 A1 | 8/2010 | Leighton et al. | |
| 2010/0226372 A1 | 9/2010 | Watanabe | |
| 2010/0257566 A1* | 10/2010 | Matila | 725/62 |
| 2010/0293479 A1* | 11/2010 | Rousso et al. | 715/760 |
| 2010/0299439 A1 | 11/2010 | McCarthy et al. | |
| 2010/0332595 A1* | 12/2010 | Fullagar et al. | 709/203 |
| 2011/0078000 A1 | 3/2011 | Ma et al. | |
| 2011/0078230 A1 | 3/2011 | Sepulveda | |
| 2011/0238501 A1 | 9/2011 | Almeida | |
| 2011/0252142 A1 | 10/2011 | Richardson et al. | |
| 2011/0258049 A1 | 10/2011 | Ramer et al. | |
| 2011/0276623 A1 | 11/2011 | Girbal | |
| 2012/0179839 A1 | 7/2012 | Raciborski et al. | |

FOREIGN PATENT DOCUMENTS

| | | | |
|---|---|---|---|
| WO | WO 2007/007960 A1 | 1/2007 | |
| WO | WO 2012/044587 A1 | 4/2012 | |

OTHER PUBLICATIONS

Liu et al., "Combined mining of Web server logs and web contents for classifying user navigation patterns and predicting users' future requests," Data & Knowledge Engineering 61 (2007) pp. 304-330.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

First Office Action in Chinese Application No. 200980119995.0 dated Jul. 6, 2012.

American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

International Search Report and Written Opinion in PCT/US2011/053302 mailed Nov. 28, 2011 in 11 pages.

International Search Report and Written Opinion in PCT/US2011/061486 mailed Mar. 30, 2012 in 11 pages.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Supplementary European Search Report in Application No. 09727694.3 mailed Jan. 30, 2012 in 6 pages.

* cited by examiner

CONTENT MANAGEMENT

CROSS-REFERENCE TO RELATED APPLICATIONS

This application is a divisional of, and thus claims the benefit of, U.S. patent application Ser. No. 12/189,019, filed on Aug. 8, 2008, which in turn is a divisional of, and thus claims the benefit of, U.S. application Ser. No. 12/060,213, filed on Mar. 31, 2008. The disclosures of each of the foregoing identified applications are expressly incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to the management and processing of resource requests made to a content delivery network ("CDN") service provider from client computing devices. Specifically, aspects of the disclosure will be described with regard to monitoring resource requests from a cluster of client computing devices and managing content for delivery to one or more client computing devices based on the monitored resource requests for the cluster. Further aspects of the disclosure are directed to monitoring resource requests corresponding to classes associated with client computing devices based on such monitored resource requests. Although various aspects of the disclosure will be described with regard to illustrative examples and embodiments, one skilled in the art will appreciate that the disclosed embodiments and examples should not be construed as limiting.

Figure 1:
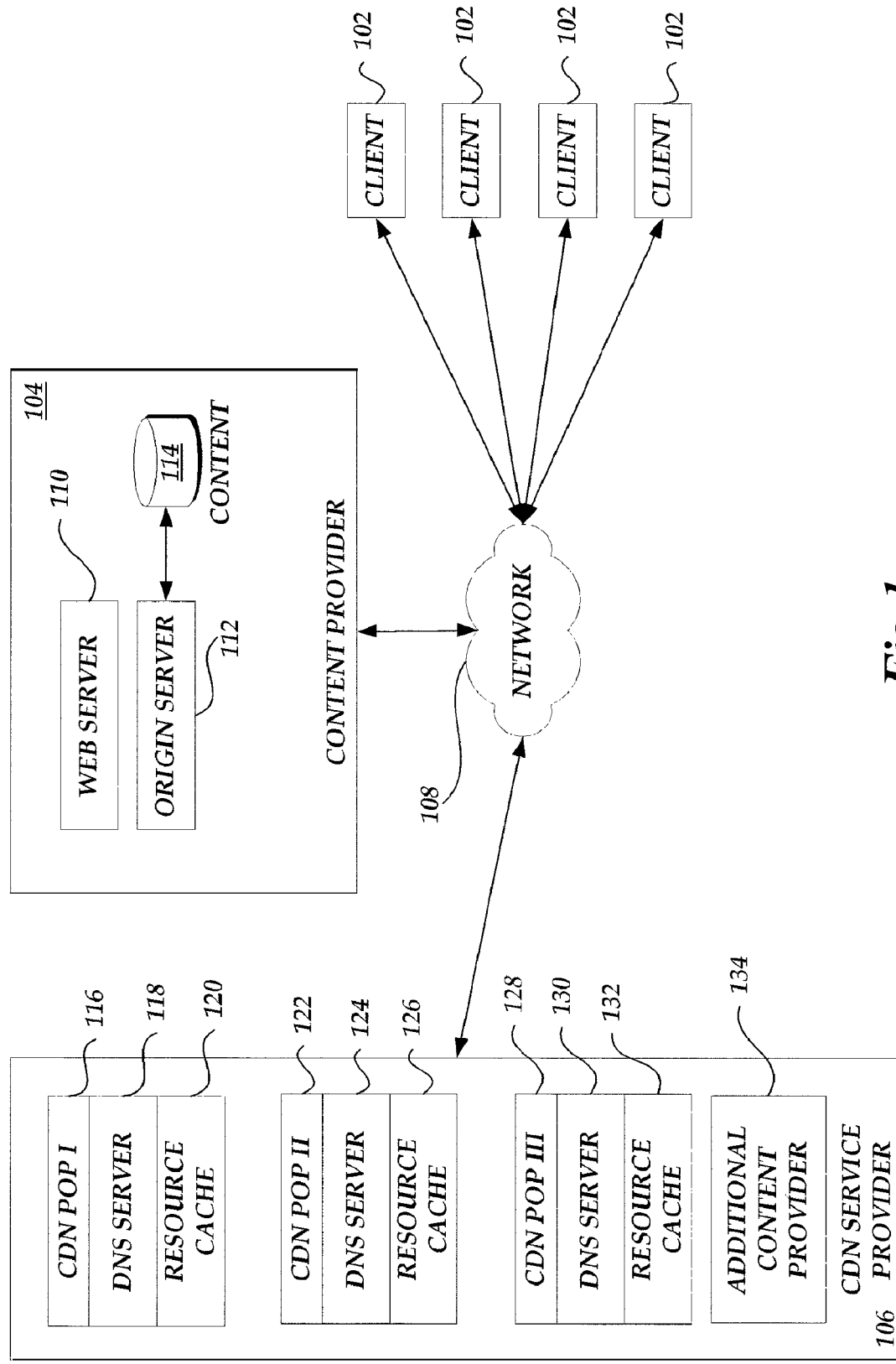
FIG. 1 is a block diagram illustrative of content delivery environment including a number of client computing devices, a content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126, 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such as an additional content provider 134, additional computing devices for administration of content and resources, and the like.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

Figure 2:
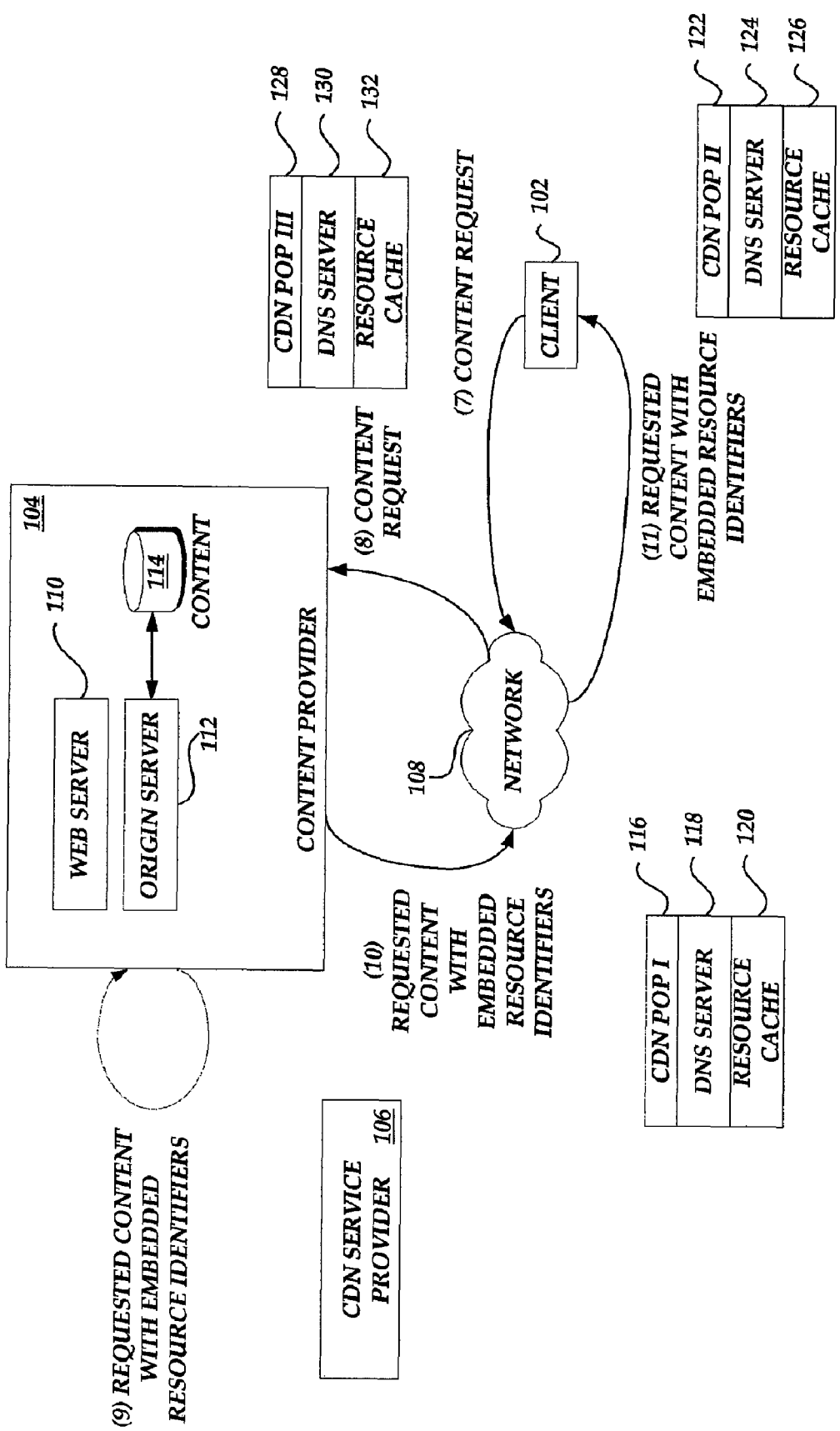
FIG. 2 is a block diagram of the content delivery environment of FIG. 1 illustrating the generation and processing of a content request from a client computing device to a content provider.
Figure 3:
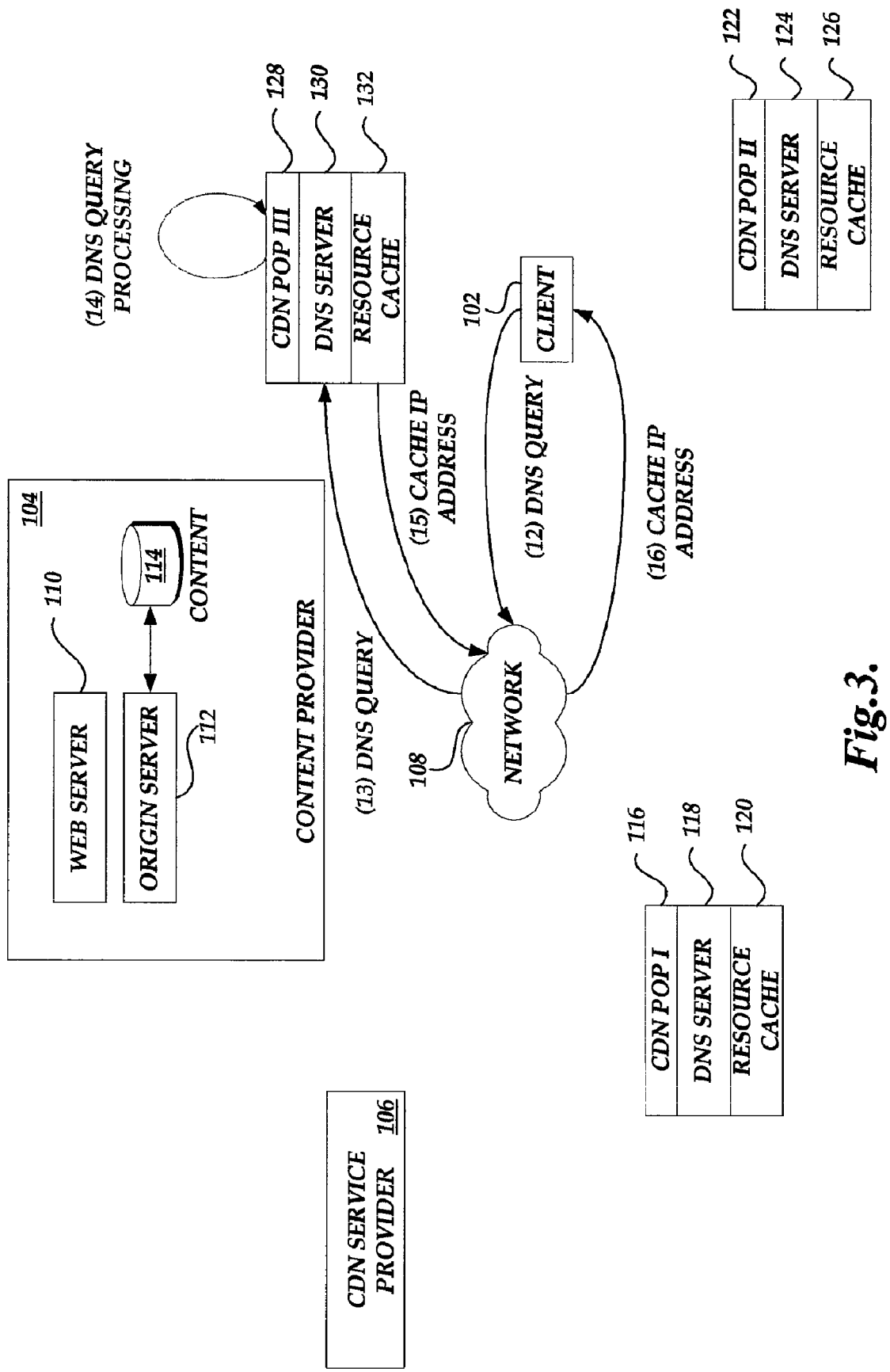
FIG. 3 is a block diagram of the content delivery environment of FIG. 1 illustrating the generation and processing of a DNS query corresponding to an embedded resource from a client computing device to a content delivery network service provider.
Figure 4:
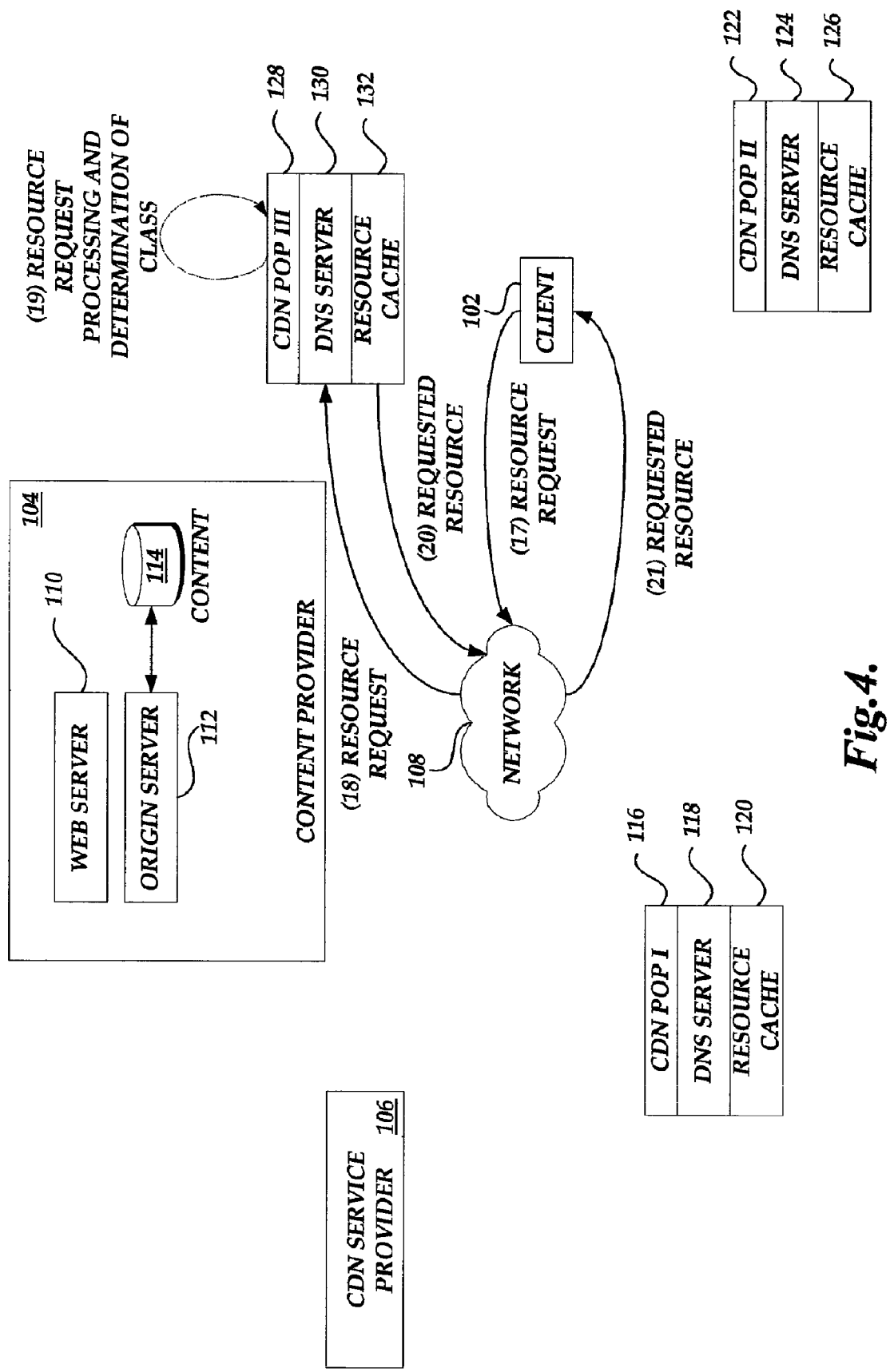
FIG. 4 is a block diagram of the content delivery environment of FIG. 1 illustrating the generation and processing of embedded resource requests from a client computing device to a content delivery network service provider.

With reference now to FIGS. 2-4, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, a client computing device 102 generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers that corresponds to resource objects that should be obtained by the client computing device 102 as part of the processing of the requested content. The embedded resource identifiers can be generally referred to as resource identifiers or resource URLs.

In one embodiment, the resource URLs identify the domain of the CDN service provider 106 (e.g., "cdnprovider.com"), the same name of the resource to be requested (e.g., "resource.xxx") and the same path where the resource will be found (e.g., "path"). Additionally, the resource URL can include additional processing information (e.g., "additional information"). The resource URL would have the form of:

http://additional_information.cdnprovider.com/path/resources.xxx

In another embodiment, the information associated with the CDN service provider 106 is included with the resource URL, such as through prepending or other techniques, such that the resource URL can maintain all of the information associated with a URL previously associated with the content provider 104. In this embodiment, the resource URL would have the form of:

http://additional_information.cdnprovider.com/www.contentprovider.com/ath/resource.xxx Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the Resource URL resource identifier that results in the identification of a DNS server authoritative to the "." and the "corn" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

With reference now to FIG. 3, in an illustrative embodiment, the successful resolution of the "cdnprovider" portion of the resource URL identifies a network address, such as an IP address, of a DNS server associated with the CDN service provider 106. In one embodiment, the IP address can be a specific network address unique to a DNS server component of a POP. In another embodiment, the IP address can be shared by one or more POPs. In this embodiment, a further DNS query provided to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP. It will be appreciated by one skilled in the relevant art that a number of ways exist to determine network topology distance.

With continued reference to FIG. 3, in either of the above identified embodiments (or any other embodiment), a specific DNS server in the DNS component 118 of a POP 116 receives the DNS query corresponding to the resource URL from the client computing device 102. Once one of the DNS servers in the DNS component 118 receives the request, the specific DNS server attempts to resolve the request. In one illustrative embodiment as shown in FIG. 3, a specific DNS server resolves the DNS query by identifying an IP address of a resource cache component that will process the request for the requested resource. Upon selection of a resource cache component 120, 126, 132, the DNS server component 118 provides an IP address of the cache server computing device, resource cache component or load balancer/load share device associated with a resource cache component.

With reference now to FIG. 4, the client computing device 102 can then utilize Internet communication protocols to request the resource from a resource cache component identified by the IP address. The resource cache component then processes the request, as will be described in greater detail below, and provides the resource to the client computing device 102. Upon receipt, the requested resource is processed by the browser application on the client computing device 102 as appropriate. It will be appreciated by one skilled in the relevant art that a selected resource cache component 120, 126, 132 can either provide the requested resource if it is available, as described above, or attempt to obtain the requested resource from another source, such as a peer cache server computing device or the origin server 112 of the content provider 104.

With continued reference to FIG. 4, in conjunction with processing the resource request, the resource cache component determines a class associated with the requesting client computing device. In one embodiment, the resource cache component utilizes information received from the client request to determine the class. The class can be determined from the client directly (such as information provided by the client computing device or ISP) or indirectly (such as inferred through a client computing device's IP address). Additionally, the resource cache component can use additional information to determine the class, such as a time zone in which the requesting client computing device is located. The resource cache component associates the class information with the requested content and maintains the associated class information, for example in a log file, for sharing with the CDN service provider 106. In an illustrative embodiment, the determination of class can be statically determined based on predefined class definitions so that the association of the class can be done at the time of receiving resource requests. For example, a geographic location may be known at the time of request processing. In another embodiment, the determination of class can be dynamic and may not be determined (or determinable) at request processing. For example, behavioral classes based on observing behavior over a time window may not be determined until completion of the observation window's processing of the observed data.

In one illustrative embodiment, the class can correspond to a specific geographic region to which the client computing device belongs. In addition or alternatively, the class can correspond to a temporal domain, e.g., time zone, business hours, daytime/nighttime, holidays, and the like. In another embodiment, the class can correspond to a particular subject area, such as a news group, associated with either the requested content or the user or both. Still further the class can correspond to demographic data. Depending on the information to be collected from the requesting client computing device, the resource cache component can determine and maintain this information in a number of ways as will be appreciated by one skilled in the relevant art. Moreover, it will further be appreciated by one skilled in the relevant art that one or more computing devices at the POP where the resource request is received can perform any of the above described functions.

Figure 5:
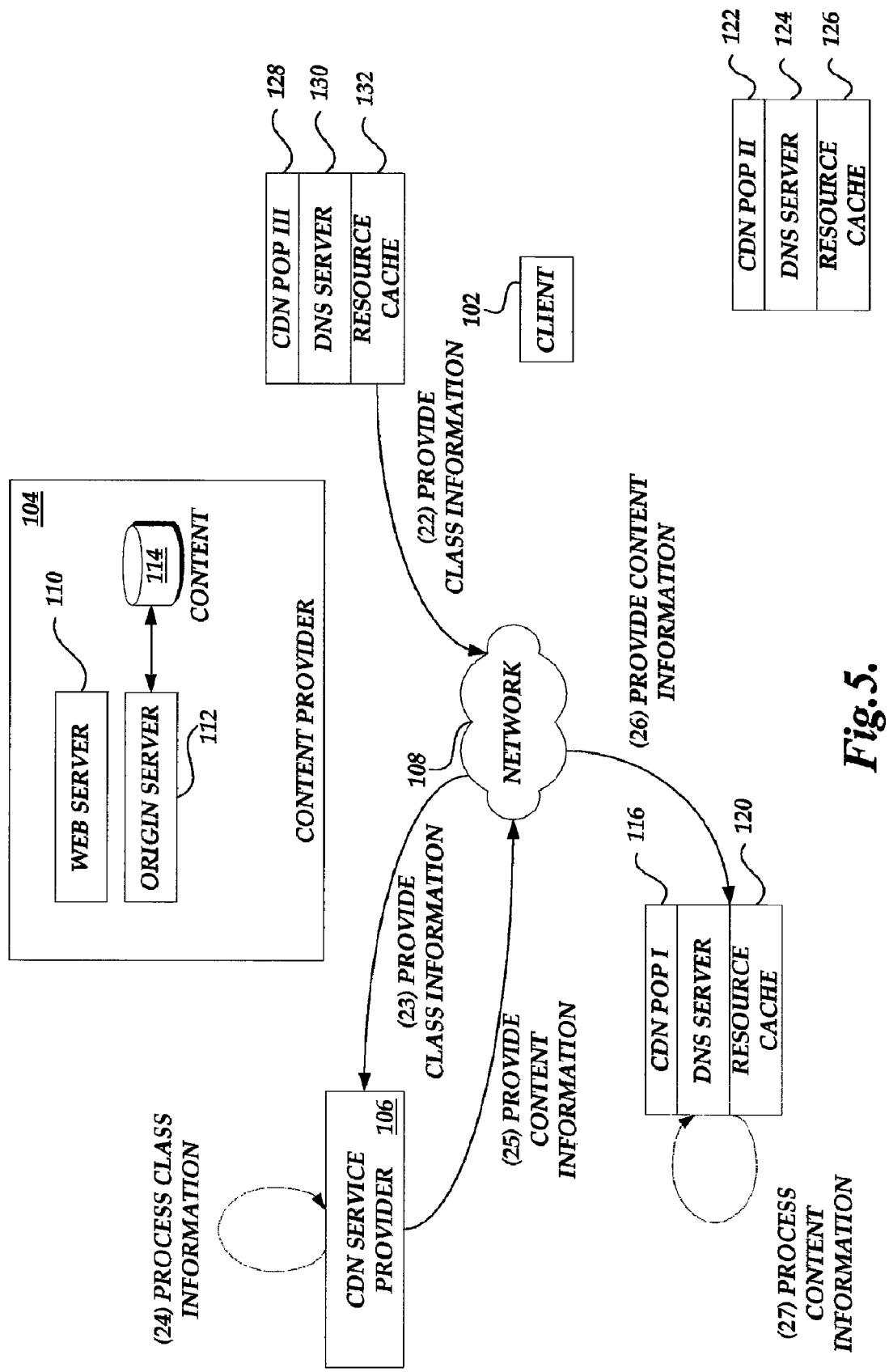
FIG. 5 is a block diagram of the content delivery environment of FIG. 1 illustrating the processing and management of associated class information collected by a resource cache component.

With reference now to FIG. 5, an illustrative embodiment of how the CDN service provider 106 processes and manages the associated class information collected by the resource cache component 132 will be described. The resource cache component 132 provides the associated class information collected at the POP 128 to the CDN service provider 106. The associated class information can then be processed by the CDN service provider in a number of ways. In one embodiment, the CDN service provider can identify content information for providing to a computing device of the CDN based on the associated class information. The identified content information can include a list of frequently requested content based on the associated class information collected at the resource cache component 132. Alternatively, the identified content information can include the frequently requested content itself, as well as additional information associated with the frequently requested content such as network performance metrics, content provider service level agreements, and the like, and/or other corresponding content (for example, corresponding documents, advertisements, and the like, as will be described in further detail below with respect to FIG. 7).

In addition to identifying content information, the CDN service provider 106 can identify a specific cache component 120 for providing this content information to. The identification of the specific cache component may also be based on the associated class information collected at the resource cache component 132. For example, where the class corresponds to a time zone, the CDN service provider may identify a resource cache component 120 that is authorized to service a client computing device having a different time zone. In another embodiment, the CDN service provider could simply send the identified content information to all or a subset of resource cache components of the CDN service provider and allow the cache components to determine how to manage the identified content information.

With continued reference to FIG. 5, in accordance with the present illustrative embodiment, once the associated class information is processed by the CDN service provider, the identified content information is provided to the selected resource cache component 120 which in turn manages the identified content information provided by the CDN service provider 106. In one embodiment, the cache component 120 manages the identified content information by obtaining the content from a storage location in anticipation of subsequent content requests at the cache component 120 for the identified content. In another embodiment, the cache component 120 can move the identified content from disk memory to memory of the cache component 120. In yet another embodiment, the cache component 120 can alter an expiration associated with the identified content in memory of the cache component 120 so as to ensure that the content remains available when later requested by a client computing device. In a yet further embodiment, the cache component 120 can simply verify the availability of the identified content at the cache component.

One skilled in the relevant art will appreciate that any various methodologies or algorithms may be utilized to process and manage the associated class information within the spirit and scope of the present disclosure. The following specific examples will be provided for further illustrative purposes.

In one embodiment, where the class information corresponds to content requests monitored for a set of client computing devices in a region having a first time zone, the CDN service provider processes the class information to identify a set of frequently requested resources in the first time zone. The CDN service provider then preloads content associated with the identified set of frequently requested resources at a cache component which is authorized to service a set of client computing devices in a different time zone. Accordingly, the CDN service provider is able to thereafter provide such preloaded content at lower delivery latencies. One skilled in the relevant art will further appreciate that the cache component authorized for servicing the set of client computing devices located in a different time zone can preload content at any suitable time based on processing constraints applicable to the individual cache component. In addition, it will be yet further appreciated by one skilled in the relevant art that the content may be wholly or partially preloaded at the cache component.

In another illustrative embodiment, the CDN service provider processes the associated class information to identify a list of frequently requested resources and provides this list to a set of resource cache components. Each resource cache component can then individually determine whether to preload one or more of the frequently requested resources.

In a further illustrative embodiment, where the content information is a content list derived from resource requests made by a first cluster of client computing devices and where the content list has been provided to a cache component for servicing a second cluster of client computing devices, the CDN service provider can further monitor whether client computing devices in the second cluster subsequently request content from the list. The CDN service provider can then determine whether modifications should be made to content lists recommended by the first cluster to the second cluster based on the subsequent learned behavior of the second cluster. It will be appreciated by one skilled in the relevant art that a variety of logic may be implemented to monitor such behavior and to update recommendations based thereon.

In a still further illustrative embodiment, the CDN service provider monitors resource requests from a first cluster of client computing devices and identifies a set of content corresponding thereto. The CDN service provider can then manage the identified set of content at a resource cache component authorized to service a second cluster of client computing devices. As set forth above, there are a number of ways to manage the identified set of content, e.g., preloading the content at the resource cache component, verifying availability of content, managing cache control information related to content in memory (e.g., changing expiration data or manipulating expiration variables), and the like. It will further be appreciated by one skilled in the relevant art that the first and second clusters may be the same or different.

In yet another embodiment, the CDN service provider monitors resource requests associated with a class of computing devices and associates the resources requested with the class. The CDN service provider then, in one embodiment, preloads content at a resource cache component of the CDN as a function of the class. This function can involve a matching determination in which the CDN service provider matches a class of the client computing device with a class associated with the resources. For example, the CDN provider may match a topic of interest class, such as basketball scores, with resources that have been associated with the same class based on previous requests. Alternatively, the function can involve a correlation determination in which the CDN service provider correlates a class of the client computing device with a different class associated with the resources. For example, the CDN service provider may correlate a first geographic class, such as New York City, with another geographic class, such as San Francisco. In an illustrative embodiment, determination of matching or correlation may be facilitated through a manual process, such as by an administrator, or based on observed behaviors.

Figure 6:
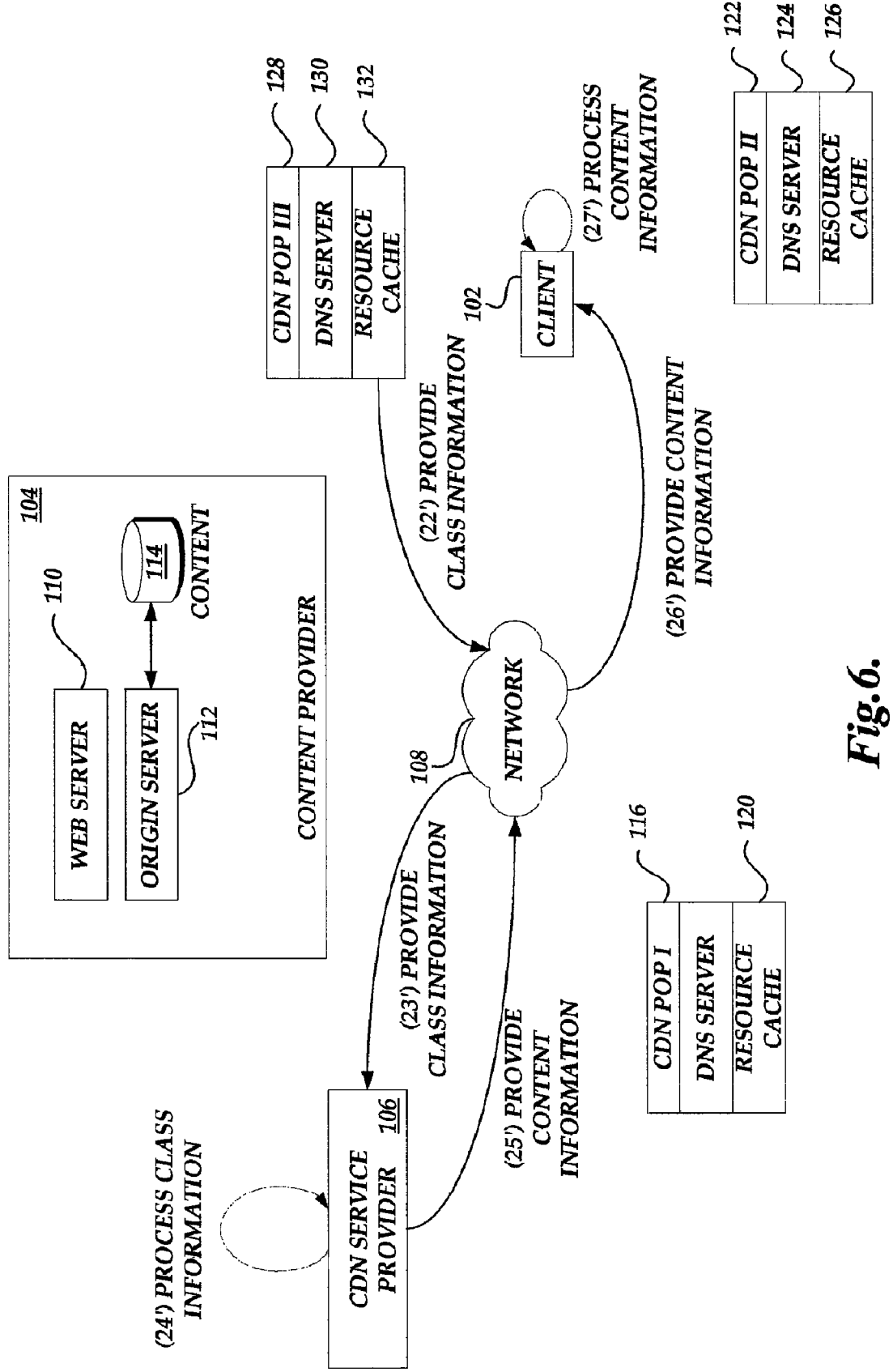
FIG. 6 is a block diagram of the content delivery environment of FIG. 1 illustrating another embodiment of the processing and management of associated class information collected by a resource cache component.

With reference now to FIG. 6, an alternative embodiment directed to how the CDN service provider 106 processes and manages the associated class information collected by the resource cache component 132 will now be described. This embodiment is virtually identical to the embodiments described above in reference to FIG. 5 with the exception that instead of identifying a specific resource cache component for sending the identified content information to, a client computing device is identified. In addition, the subsequent processing functions performed by identified resource cache components in the above embodiments can now be similarly performed by identified client computing devices. In accordance with this alternative embodiment, the CDN service provider 106 includes a client component, such as a software application, for managing the identified content information at the client computing device. The CDN service provider 106 provides the client component to client computing devices desiring to participate in such a service.

With continued reference to FIG. 6, in a specific illustrative embodiment, the resource cache component 132 provides the associated class information collected at the resource cache component 132 to the CDN service provider 106. In this embodiment, the associated class information includes data identifying content corresponding to requests made for a class associated with a first set of client computing devices. Upon receipt of this associated class information, the CDN service provider 106 identifies a second set of client computing devices as a function of the class of the first set of computing devices. The CDN service provider then provides content information related to the resource requests to a client computing device in the second set of client computing devices. In this illustrative embodiment, the content information includes a list of frequently requested content for the class associated with the first set of client computing devices. The client computing device in the second set of devices manages this content information (via a client side application provided by the CDN service provider) by verifying the availability of the listed content and obtaining one or more of the listed resources if not available.

Figure 7:
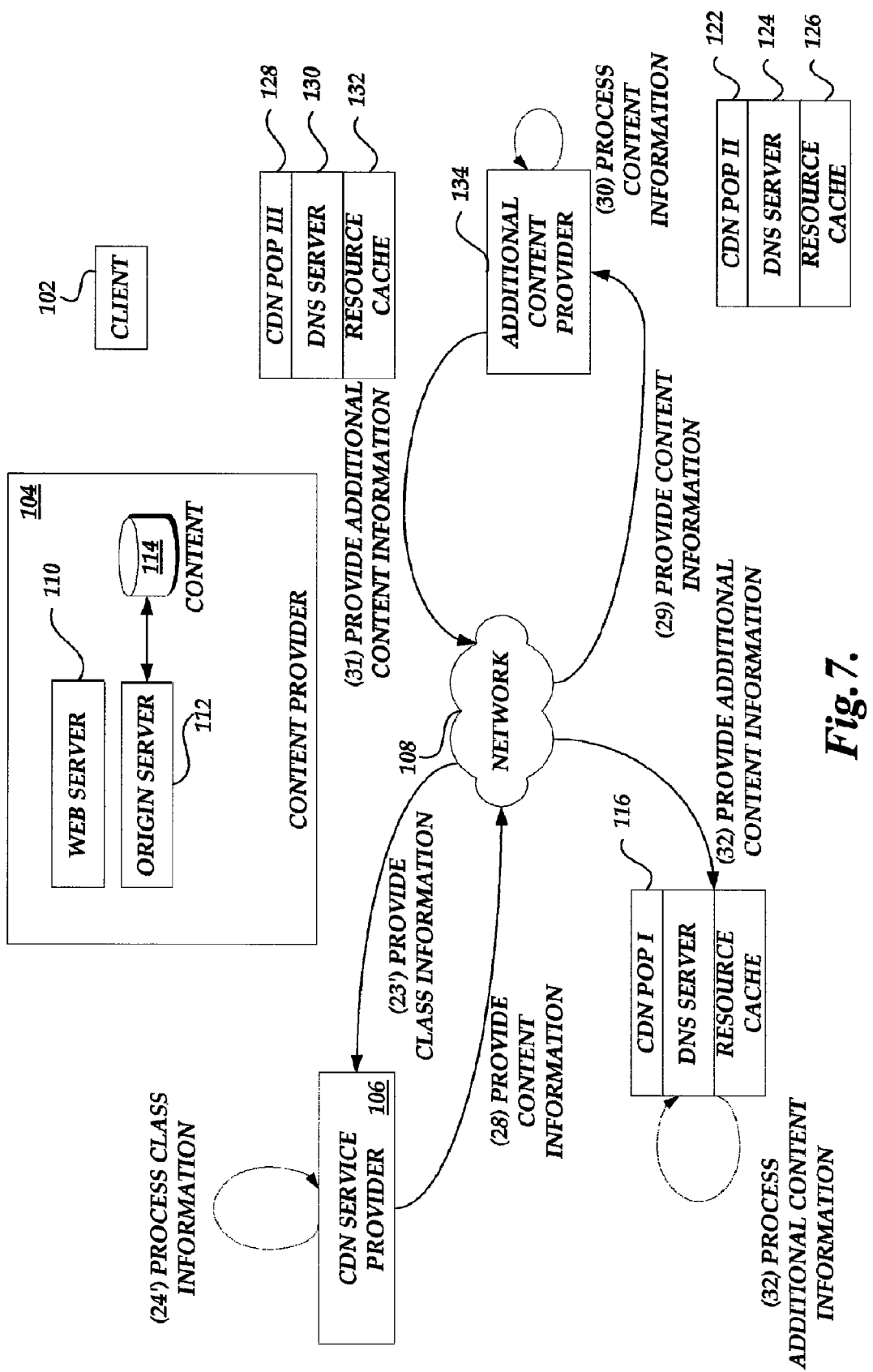
FIG. 7 is a block diagram of the content delivery environment of FIG. 1 illustrating yet another embodiment of the processing and management of associated class information collected by a resource cache component.

With reference now to FIG. 7, in one embodiment, the CDN service provider 106 may provide the class information collected from the POPs for additional processing. As previously illustrated in FIG. 1, one or more additional content providers 134 may be part of the CDN service provider 106. The additional content providers 134 can correspond to additional components or services associated with the CDN service provider 106, such as advertisement engines or services, recommendation engines or services, security applications or services, and the like. Additionally, although the third party content providers 134 were previously illustrated as part of the CDN service provider 106, one skilled in the relevant art will appreciate that one or more of the third party content providers 134 may be independent.

Based on the class information provided by the CDN service provider 106 or otherwise made available by the CDN service provider 106, the third party content providers 134 can utilize the class information as inputs. For example, in one embodiment, if the third party content provider 134 corresponds to an advertisement engine or component, the class information can be processed to anticipate future advertisement display opportunities at the cache. Accordingly, the third party content provider 134 can process the input and the CDN service provider 106 can take additional steps. In another example, if the third party content provider 134 corresponds to a recommendation engine or component, the class information can be processed to anticipate additional content requests or future content request. Accordingly, the third party content provider 134 can process the input and the CDN service provider 106 can take additional steps. One skilled in the relevant art will appreciate that any various methodologies or algorithms may be utilized to process the class information within the spirit and scope of the present disclosure.

With continued reference to FIG. 7, the additional content provider 134 can provide processed information back to the CDN service provider 106 for further processing. Additionally or alternatively, the additional content provider 134 can provide the processed information directly to one or more POPs, such as POP 116. In either embodiment, the additional action undertaken by the CDN service provider 106 can include notifications of additional advertisement and/or display opportunities, the identification of additional content that can also be preloaded to a resource cache component, and/or the further management of content already stored at the resource cache component.

Figure 8:
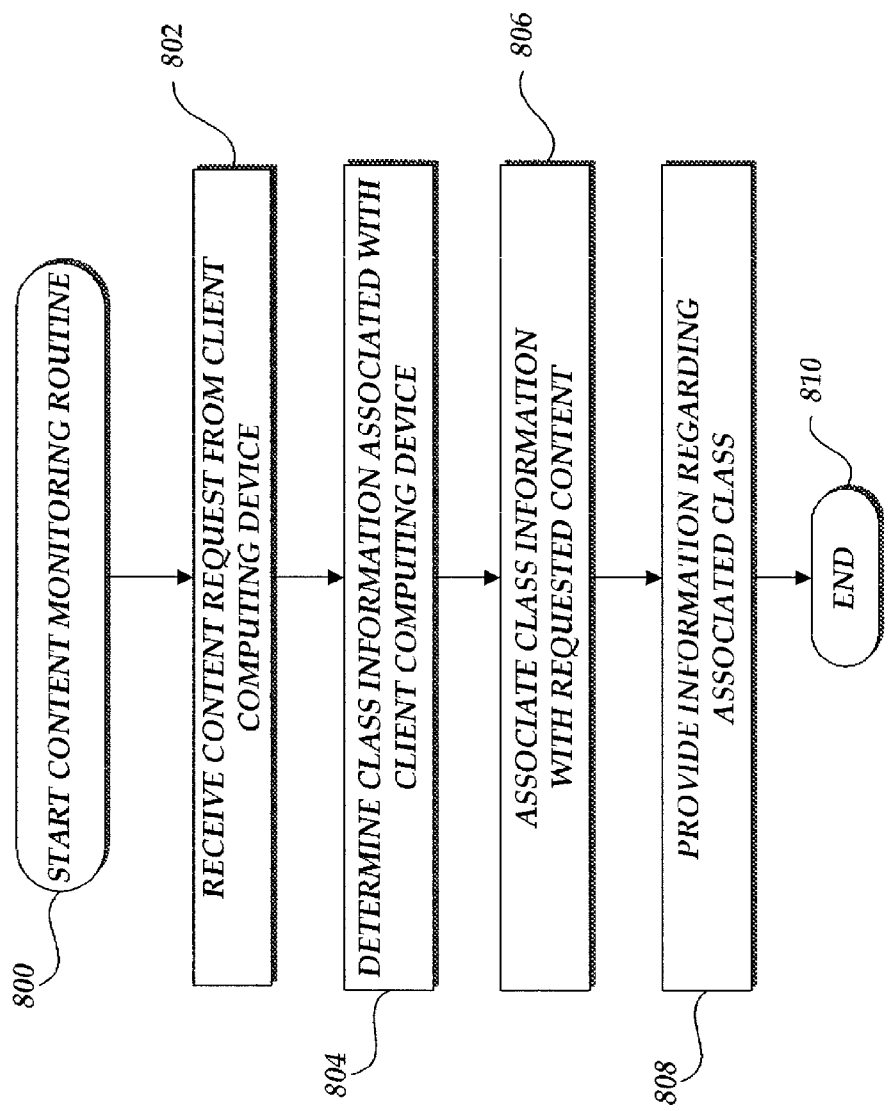
FIG. 8 is a flow diagram illustrative of a content monitoring routine implemented by a content delivery network service provider for monitoring resource requests from client computing devices.

With reference now to FIG. 8, one embodiment of a content monitoring routine 800 implemented by the CDN service provider 106 for monitoring resource requests from client computing devices will be described. One skilled in the relevant art will appreciate that actions/steps outlined for routine 800 may be implemented by one or many computing devices/components that are associated with the CDN service provider 106. Accordingly, routine 800 has been logically associated as being generally performed by the CDN service provider 106, and thus the following illustrative embodiments should not be construed as limiting.

At block 802, a resource cache component 132 receives a content request from a client computing device. Class information associated with the client computing device is then determined at block 804. In an illustrative embodiment, the determination of class information at block 804 can specifically include associating the requesting client computing device to a first cluster of other client computing devices based on a variety of criteria. In one example, the criteria correspond to a time zone in which the client computing devices are located. Continuing at block 806, the resource cache component further associates the identified class information with the requested content. Next, at block 808, the resource cache component 132 provides information to the CDN service provider 106 regarding the associated class. The routine ends at block 810.

Figure 9:
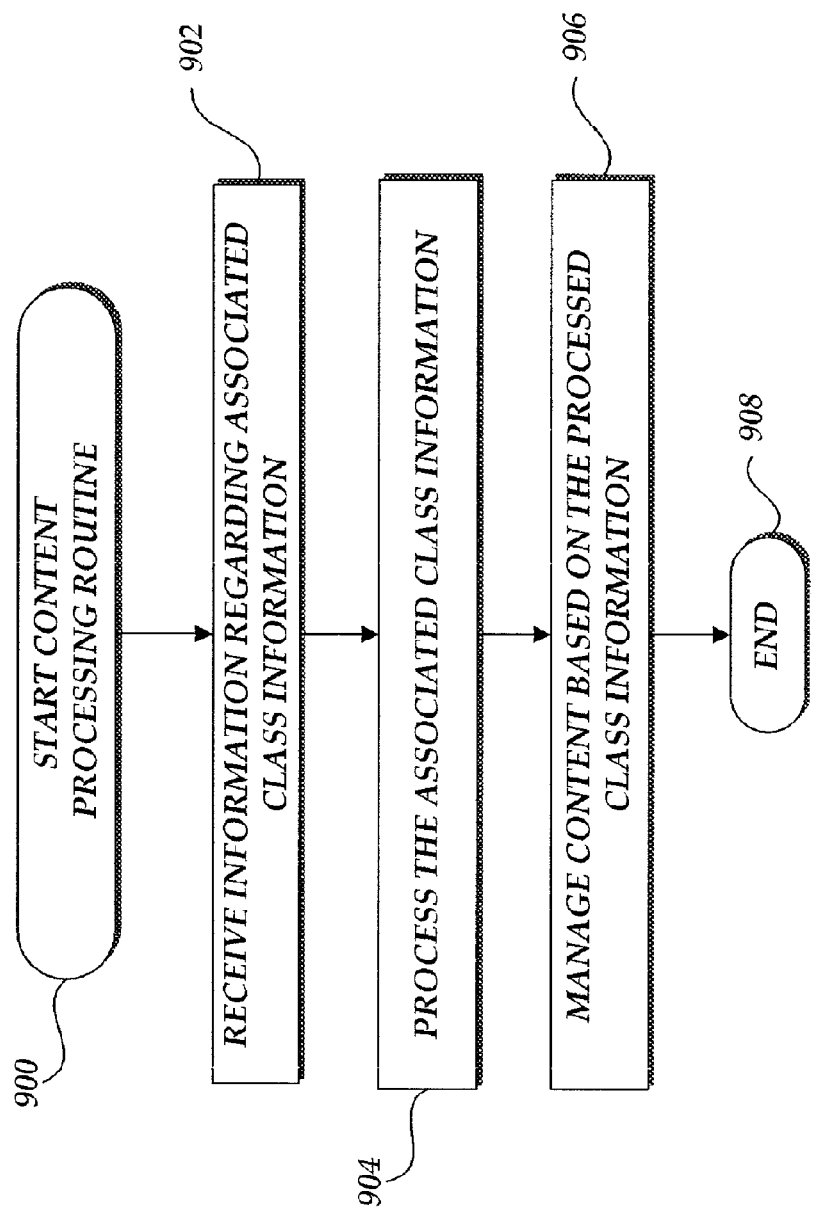
FIG. 9 is a flow diagram illustrative a content processing routine implemented by a content delivery network service provider for managing content for delivery to a class of client computing devices.

With reference now to FIG. 9, one embodiment of a content processing routine 900 for managing content for delivery to a class of client computing devices will be described. One skilled in the relevant art will appreciate that actions/steps outlined for routine 900 may be implemented by one or many computing devices/components that are associated with the CDN service provider 106. Accordingly, routine 900 has been logically associated as being performed by the CDN service provider 106.

At a block 902, the CDN service provider 106 receives information regarding associated class information, such as that provided from a resource cache component at block 810 of FIG. 8. Next, at a block 904, the CDN service provider 106 processes the received class information. As described above, a variety of logic for processing the received class information can be implemented at the CDN service provider. Continuing with the illustrative embodiment described in reference to FIG. 8, the CDN service provider 106 receives information about resources requests made by client computing devices in a first time zone and processes this information by identifying content for a cache component authorized to service a client computing device in a second time zone based on the resource requests made by client computing devices in the first time zone. For example, the CDN service provider 106 may provide a list of most frequently requested content in the first time zone to the cache component which is authorized to service client computing devices in a second time zone.

Continuing at a block 906 of FIG. 9, the CDN service provider manages content based on the processing performed on the associated class information at block 904. As also set forth above, a variety of logic for managing content can be implemented. In accordance with the present illustrative embodiment, the CDN service provider can manage content based on the processed information by obtaining, at the cache component in the second time zone, the identified content from a storage location or, more specifically, by preloading content from the list at the cache component in anticipation of similar requests from client computing devices in the second time zone. The routine 900 ends at block 908.

It will be appreciated by those skilled in the art and others that while processing and management functions have been described herein as being performed at various components of the CDN service provider, these functions can be distributed across one or more computing devices of the CDN service provider. In addition, the content requests and associated class information monitored at resource cache components can be maintained globally by the CDN service provider and shared with all or some subset of the cache components of the CDN service provider. Similarly, the content information identified based on processing the associated class information can be provided as a batch process to resource cache components or sent in response to a request from one cache component to another.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method comprising:
    determining, at a content delivery network service provider, a class associated with a subset of client computing devices serviced by the content delivery network service provider, wherein the content delivery network service provider hosts content on behalf of a content provider;
    monitoring resource requests for the determined class, wherein the resource requests correspond to requests for a first subset of the content hosted on behalf of the content provider;
    automatically determining, by one or more computing devices, additional content information associated with the monitored resource requests for the determined class, wherein the additional content information corresponds to information associated with a second subset of the content hosted on behalf of the content provider;
    identifying at least one cache component for receiving the additional content information, wherein the identity of the at least one cache component is determined as a function of the determined class; and
    providing the additional content information to the identified cache component,
    wherein the method is performed by one or more computing devices of the content delivery network service provider.

2. The method of claim 1, wherein the additional content information includes advertisement content.

3. The method of claim 1, wherein the additional content information includes content provided in anticipation of an additional resource request.

4. A system comprising:
    one or more network points of presence associated with a content delivery network service provider, wherein the content delivery network service provider hosts content on behalf of a content provider and wherein any one or combination of the one or more network points of presence is operable to:
        determine a class associated with a subset of client computing devices serviced by the content delivery network service provider;
        monitor resource requests for the determined class, wherein the resource requests correspond to requests for a first subset of the content hosted on behalf of the content provider;
        automatically determine additional content information associated with the monitored resource requests for the determined class, wherein the additional content information corresponds to information associated with a second subset of the content hosted on behalf of the content provider;
        responsive to determining the additional content information, identify at least one cache component for receiving the additional content information, wherein the identity of the at least one cache component is determined as a function of the determined class; and
        provide the additional content information to the identified cache component.

5. The system of claim 4, wherein the additional content information includes advertisement content.

6. The system of claim 4, wherein the additional content information includes content provided in anticipation of an additional resource request.

7. The system of claim 4, wherein monitoring resource requests for the determined class includes identifying frequently requested content for the determined class and wherein the additional content information is associated with the frequently requested content for the determined class.

8. The system of claim 4, wherein the additional content information comprises a list of additional resources for the determined class.

9. The system of claim 8, wherein the any one or combination of the one or more network points of presence is further operable to verify availability of the listed additional resources for delivery to the identified at least one cache component.

10. The system of claim 9, wherein the any one or combination of the one or more network points of presence is further operable to obtain one or more of the listed additional resources if the one or more of the listed additional resources are not available.

11. The system of claim 8, wherein the any one or combination of the one or more network points of presence is further operable to:
   select content to be loaded at the at least one cache component based on the list of additional resources;
   verify availability of the listed additional resources for delivery by the at least one cache component; and
   obtain one or more of the listed additional resources at the at least one cache component if the one or more of the listed additional resources are not available.

12. The method of claim 1, wherein monitoring resource requests for the determined class includes identifying frequently requested content for the determined class and wherein the additional content information is associated with the frequently requested content for the determined class.

13. The method of claim 1, wherein the additional content information comprises a list of additional resources for the determined class.

14. The method of claim 13 further comprising verifying availability of the listed additional resources for delivery to the identified at least one cache component.

15. The method of claim 14 further comprising obtaining one or more of the listed additional resources if the one or more of the listed additional resources are not available.

16. The method of claim 13 further comprising:
   selecting content to be loaded at the at least one cache component based on the list of additional resources;
   verifying availability of the listed additional resources for delivery by the at least one cache component; and
   obtaining one or more of the listed additional resources at the at least one cache component if the one or more of the listed additional resources are not available.

* * * * *

UNITED STATES PATENT AND TRADEMARK OFFICE
CERTIFICATE OF CORRECTION

PATENT NO. : 8,352,613 B2
APPLICATION NO. : 12/956566
DATED : January 8, 2013
INVENTOR(S) : Swaminathan Sivasubramanian et al.

Page 1 of 1

It is certified that error appears in the above-identified patent and that said Letters Patent is hereby corrected as shown below:

In the Specification

At Col. 5, Line 11, please delete "com/ath" and insert --com/path--.

At Col. 5, Line 22, please delete ""corn"" and insert --"com"--.

Signed and Sealed this
Fifteenth Day of October, 2013

Teresa Stanek Rea
*Deputy Director of the United States Patent and Trademark Office*